(12) United States Patent
Mertens et al.

(10) Patent No.: US 12,394,342 B2
(45) Date of Patent: Aug. 19, 2025

(54) DISPLAY APPARATUS FOR A MOTOR VEHICLE

(71) Applicant: AUDI AG, Ingolstadt (DE)

(72) Inventors: Joris Mertens, Ingolstadt (DE); Jacques Hélot, Ingolstadt (DE); Immo Redeker, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 522 days.

(21) Appl. No.: 17/624,096

(22) PCT Filed: Jun. 26, 2020

(86) PCT No.: PCT/EP2020/068012
§ 371 (c)(1),
(2) Date: Dec. 30, 2021

(87) PCT Pub. No.: WO2021/018490
PCT Pub. Date: Feb. 4, 2021

(65) Prior Publication Data
US 2022/0355667 A1 Nov. 10, 2022

(30) Foreign Application Priority Data
Aug. 1, 2019 (DE) ............... 10 2019 211 518.7

(51) Int. Cl.
*G09F 21/04* (2006.01)
*B60K 35/22* (2024.01)
(Continued)

(52) U.S. Cl.
CPC ............ *G09F 21/049* (2020.05); *B60K 35/60* (2024.01); *G03B 21/14* (2013.01); *B60K 35/10* (2024.01);
(Continued)

(58) Field of Classification Search
CPC ........ B60K 35/60; B60K 35/10; B60K 35/22; B60K 2360/1438; B60K 2360/1523;
(Continued)

(56) References Cited

U.S. PATENT DOCUMENTS 4,636,782 A 1/1987 Nakamura et al.
2006/0278155 A1* 12/2006 Soltendieck ......... G01C 21/265
116/62.4
(Continued)

FOREIGN PATENT DOCUMENTS

CN 102016690 A 4/2011
CN 102822723 A 12/2012
(Continued)

OTHER PUBLICATIONS

Chinese Office Action dated Aug. 31, 2023 for parallel Chinese Application No. 202080044064.5.
(Continued)

*Primary Examiner* — Magda Cruz
(74) *Attorney, Agent, or Firm* — STAAS & HALSEY LLP

(57) ABSTRACT

A one-piece display has a main display area at least partly viewable from one point of observation, and a secondary display area arranged so as to not be viewable from that point of observation. The main display area and the secondary display area are arranged relative to one another in such a way that the secondary display area is reflected in the main display area to produce a virtual display plane that is viewable from the point of observation.

16 Claims, 4 Drawing Sheets

(51) Int. Cl.
    *B60K 35/60* (2024.01)
    *G03B 21/14* (2006.01)
    *B60K 35/10* (2024.01)

(52) U.S. Cl.
    CPC ...... *B60K 35/22* (2024.01); *B60K 2360/1438* (2024.01); *B60K 2360/1523* (2024.01); *B60K 2360/27* (2024.01); *B60Y 2200/11* (2013.01)

(58) Field of Classification Search
    CPC .......... B60K 2360/27; B60K 2360/339; B60K 2360/343; B60K 35/00; B60K 37/20; B60Y 2200/11; G02B 2027/015; G02B 2027/0152; G09F 9/33; G09F 21/049; G09F 21/04; G03B 21/14
    USPC .......................................................... 353/14
    See application file for complete search history.

(56) References Cited

U.S. PATENT DOCUMENTS

| | | | |
|---|---|---|---|
| 2009/0268163 | A1 | 10/2009 | Bowden et al. |
| 2013/0088412 | A1* | 4/2013 | Helot ................ G09G 5/00 345/3.1 |
| 2015/0015518 | A1* | 1/2015 | Giesler ............ B60R 11/0235 345/173 |
| 2017/0108988 | A1 | 4/2017 | Kim |
| 2018/0217388 | A1* | 8/2018 | Laack .................. B60K 35/60 |
| 2018/0219052 | A1* | 8/2018 | Laack ................ G02B 27/0149 |
| 2018/0260001 | A1* | 9/2018 | Klug ..................... G02B 30/24 |
| 2020/0398668 | A1* | 12/2020 | Mertens ............... B60K 35/654 |

FOREIGN PATENT DOCUMENTS

| | | | | |
|---|---|---|---|---|
| CN | 103998294 | A | | 8/2014 |
| CN | 104777614 | A | | 7/2015 |
| CN | 107310390 | A | | 11/2017 |
| CN | 108136908 | A | | 6/2018 |
| CN | 108375831 | A | | 8/2018 |
| DE | 102004054769 | A1 * | 5/2006 | ............ B60K 37/02 |
| DE | 10 2004 054 769 | B4 | | 12/2016 |
| DE | 10 2015 009 141 | A1 | | 1/2017 |
| DE | 10 2015 011 403 | A1 | | 3/2017 |
| DE | 20 2017 105 444 | U1 | | 12/2017 |
| DE | 10 2017 203 173 | A1 | | 8/2018 |
| DE | 102018202317 | B3 * | 6/2019 | ............ B60K 35/00 |
| EP | 2894509 | A1 * | 7/2015 | ......... G02B 27/0101 |
| FR | 3041786 | A1 * | 3/2017 | ............ G06F 3/0487 |

OTHER PUBLICATIONS

Translation by WIPO dated Feb. 1, 2022 of International Preliminary Report on Patentability for PCT/EP2020/068012, 9 pages.
International Search Report dated Oct. 8, 2020 from International Application No. PCT/EP2020/068012.
Office Action dated Feb. 20, 2020 from German Application No. 10 2019 211 518.7.
PCT/EP2020/068012, Jun. 26, 2020, Joris Mertens et al., Audi AG.
10 2019 211 518.7, Aug. 1, 2019, Joris Mertens et al., Audi AG.
Chinese Office Action dated Jan. 22, 2024 for Chinese Application No. 202080044064.5.

* cited by examiner

DISPLAY APPARATUS FOR A MOTOR VEHICLE

CROSS REFERENCE TO RELATED APPLICATIONS

This application is a U.S. national stage of International Application No. PCT/EP2020/068012, filed on Jun. 26, 2020. The International Application claims the priority benefit of German Application No. 10 2019 211 518.7 filed on Aug. 1, 2019. Both the International Application and the German Application are incorporated by reference herein in their entirety.

BACKGROUND

Described below is a display device for a motor vehicle and to a motor vehicle having a display device of this kind.

A display device in a motor vehicle, which is arranged in the region of a dashboard of the motor vehicle, for example, is usually designed with a flat surface. All information which is displayed on the display device, using a corresponding display on a display area of the display device, is then displayed on a display level, so that where appropriate a user of the display device has to search for a desired menu item or a desired piece of information on the display first, before it is displayed visually.

DE 10 2015 011 403 A1 discloses a method for displaying data on at least two spatial levels. The first display in this case is curved in such a manner that a first part of the display is positioned behind a second part of the display, from the viewer's point of view. Display elements can therefore be represented on the first part of the display, which appear recessed by comparison with a display on the second part of the display.

DE 10 2015 009 141 A1 shows a display device for an interior of a motor vehicle, which comprises multiple display fields and a guidance system. Through movements of the individual display fields along the guidance system, a total of three display fields can be positioned behind one another and displayed. This therefore makes it possible for there to be a display on three levels arranged one behind the other.

DE 10 2004 054 769 B4 shows a built-in combination instrument for a motor vehicle. This emits imaging light and is arranged in the viewer's immediate field of vision. A partially permeable mirror is positioned in front of a display of the built-in combination instrument, so that light from a first display device is ultimately reflected on the mirror, and from an viewer's point of view, a virtual image appears to be superimposed on the display image on the display.

SUMMARY

Described below is a space-saving display device having a plurality of optical display levels that can be provided in a motor vehicle.

It is helpful for a user of a motor vehicle to have a display provided on multiple display levels, so that information that is of interest to them can be acquired quickly and conveniently. A known display device of this kind has multiple display levels, some of which are purely virtual, includes multiple display devices, in other words, for example, multiple displays which are spatially separate from one another and are therefore configured as separate displays. Moreover, with display devices of this kind, transparent displays are frequently arranged behind one another or semi-transparent mirrors are positioned in such a manner that with the help of a mirror, a virtual level is produced. For optimal utilization of an installation space within the motor vehicle, in other words for the provision of a space-saving display device, and also for cost-reduction reasons, it may be sensible, however, for a display device to be provided which is made up of a one-piece display element. The display device for a motor vehicle described herein has a display area designed in one piece.

The display area of the display device, which is designed in one piece, has a main display area and a secondary display area. The main display area is arranged such that it is at least partially visible from a viewing point, whereas the secondary display area is arranged such that it is not visible from this viewing point. If the display device is located in a dashboard of the motor vehicle, the viewing point is a starting point, for example, for viewing by a user of the motor vehicle sitting on a driver's seat of the motor vehicle. The viewing point may therefore be located in an additionally elevated position by comparison with a height of the display device, so that an axis from the viewing point to the main display area of the display device runs forwards in a longitudinal direction of the vehicle and also downwards towards a vehicle floor in a vertical direction of the vehicle. Strictly speaking, this line of sight runs from the viewing point to the display device, in other words obliquely downwards, taking account of the longitudinal direction of the vehicle and the vertical direction of the vehicle.

The main display area and the secondary display area are arranged in such a manner in relation to one another that, viewed from the viewing point, the secondary display area is reflected in the main display area. For example, the secondary display area is arranged above the main display area, but oriented downwards towards the main display area. As a result of this reflection, a virtual display level which is visible from the viewing point is produced as a reflected image in the main display area and, in this case, behind the display level of the main display level. A reflected display content of the secondary display area is therefore shown on the virtual display level. A display of the secondary display area is therefore ultimately shown on the virtual display level. The virtual display level therefore represents the depiction which is shown on the secondary display area and which is reflected in the main display area and visible to the viewer from the viewing point. The display level of the main display area and the virtual display area (reflection) of the secondary display area are, in particular, distinguished in that the eye has to be focused for different distances from the viewing point, so that the respective display area can be brought into sharp focus or seen. The distance of the virtual display level in this case is greater than that of the display level of the main display area. Viewed from the viewing point, therefore, the virtual display area is optically perceived to be behind the display level of the main display area.

This constellation of display levels can be used to display additional information on the secondary display area, for example, such as information relating to a navigation system of the motor vehicle, like an arrow pointing in the driving direction, for example. The edge of a road is represented on the main display area itself, for example, wherein the directional arrow, which is displayed on the secondary display area and reflected in the main display area, is displayed in the virtual display level behind this road which is shown on the main display area. The road which is displayed and the directional arrow are arranged on two different display levels and are therefore arranged offset in respect of one another when viewed in perspective. As an alternative to this, an album cover image can be displayed on the main display area, for example, wherein a multimedia device in the motor vehicle plays a song from the music album whose album cover image is currently being displayed. With the help of the reflected display of the secondary display area, one or multiple further album cover images of music albums from the same artist, or also album cover images of music albums from alternative artists who fall within the same genre of music as the artist performing the song currently being played, for example, can be displayed on the virtually visible display level. With the help of the album cover images displayed on the virtual display level, it is made clear that the corresponding music on these music albums is likewise available for activation, for example at the user's request or after the music on the album displayed on the main display area has been played. With the help of the display device, an intuitive user concept is therefore possible in which information for the user of the motor vehicle can be supplied on two different display levels. In this case, however, only one component is needed, since the display device has a display area designed in one piece. The display device therefore has a space-saving design and can be fitted in the motor vehicle in a compact manner. A display concept that can be realized with the display device can, moreover, be used more ergonomically and intuitively than a user concept with only one level, since additional information can be displayed with the help of the virtual display level.

As an alternative, or in addition to, the arrangements described of the main display area and the secondary display area relative to one another, the secondary display area may, for example, be arranged above and/or to the side of the main display area.

The embodiments result in additional advantages.

An advantageous embodiment provides that the display device includes a support element and a plurality of controllable lighting elements which are arranged on the support element. The lighting elements arranged on the support element create the display area. The display device is not therefore designed as a continuous screen, that is to say, as a rigid display, for example, but it may have individual, for example individually controllable, lighting elements. The advantage of this is that an arbitrarily shaped display area is possible, on which the main display area and the secondary display area can still be arranged, since the lighting elements can be arranged on differently shaped support elements. In this way, the shaping of the display area, and therefore of the display device, is ultimately versatile and can be adapted to a desired environment in the motor vehicle. This improves the possibility of a space-saving display device being realized for the motor vehicle.

In an additional embodiment, it is provided that the multiple lighting elements are configured as organic light-emitting diodes and/or micro-light-emitting diodes in each case. The individual lighting elements of the display area may therefore be configured as OLEDs (Organic Light-Emitting Diode) or as micro-LEDs (Light-Emitting Diode), for example. This choice of light-emitting diode has the advantage that arbitrarily curved and formed display areas can be fitted with it, since the individual lighting elements, for example in the case of micro-LEDs, have a diameter smaller than 100 micrometers, for example. The ability for the individual OLEDs or micro-LEDs in each case to be individually controlled also makes it possible for the display area, which has a one-piece design, to be easily divided into the main display area and the secondary display area.

As an alternative, or in addition to this, the display area may be configured as a commercially available display, for example made of glass, or as a laminated display. Moreover, it may be provided that the main display area is configured as a known display, for example, in other words as a known screen and the secondary display area is formed from individually controllable OLEDs or micro-LEDs, or vice versa. In this way, production of the display device is more advantageously possible, which means that a particularly cost-effective display device can be produced. Nevertheless, the issue addressed is that the display area itself has a one-piece design, in other words, that there is no distinctive boundary between the main display area and the secondary display area regardless of which is formed by OLEDs, so that the main display area and the secondary display area merge straight into one another.

According to a further embodiment, it is provided that the display area has a curved design. The main display area and the secondary display area are therefore arranged at an angle greater than zero and smaller than 90 degrees to one another. Overall, the display device is therefore configured in such a manner that the main display area and the secondary display area lie opposite one another in sections, so that the secondary display area can reflect in the main display area. In this way, the display device can be arranged in a depression in the motor vehicle, for example, wherein the region of the secondary display area is arranged on an upper side of this recess in the vertical vehicle direction, whereas the main display area is arranged on a lower side of the recess, which can be seen from the viewing point and is roughly opposite the region of the secondary display area. As an alternative to this, the display device may have a freestanding design. The angle between the main display area and the secondary display area is variable in the angle range indicated, but it must be selected in such a manner that the secondary display area can still be reflected in the main display area, in other words the angle must be smaller than 90 degrees. In this way, it is possible for the individual display areas of the one-piece display area to be arranged in numerous ways and with different designs in respect of one another, and therefore for the display device to be used in a versatile manner.

Alternatively, or in addition to this, the display area may have a two-part design, wherein each of the two parts—the main display area and the secondary display area—is based on a display technology which differs from the display technology of the other part. For example, the main display area can be produced from OLEDs and the secondary display area from micro-LEDs. Costs can be optimized in this way, since a more cost-effective display technology can be selected for the secondary display area than for the main display area, for example.

Moreover, one embodiment provides that a bending edge of the curved display area is arranged between the main display area and the secondary display area. The two partial display areas of the display area, in other words the main display area and the secondary display area, are not therefore arranged in the region of the bending edge of the curved display area, but adjacent to this bending edge, for example.

This means that optical disturbances, for example, caused by mirror effects or a display on the curved bending edge are prevented, so that the display on the display area which can be seen from the viewing point, can be perceived by the user of the display device in a particularly user-friendly manner and without optical disturbances.

A particularly advantageous embodiment provides that the main display area is designed as a touch-sensitive screen. The display device is therefore not only a pure display device, but it may also be an operating device. For this purpose, for example, a selection element displayed on the main display area can be selected by the user touching the screen with their hand, for example, so that the display device may used as a navigation system or a multimedia system on board the motor vehicle that can not only display information, but can also receive inputs by the user. For example, it may be provided that the display elements shown on the main display area can be operated with the help of the touch-sensitive screen, but the display elements shown on the virtual screen level with the help of the secondary display area, are for information only and cannot be actively selected and activated by the user, for example, by touching the touch-sensitive screen. The main display area is therefore configured as a touchscreen or touchpad. In this way, a particularly intuitive user concept for the motor vehicle can be achieved. Moreover, additional operating elements, such as a lockdown switch or a toggle switch, for example, which would have to be provided in the motor vehicle in addition, can thereby be saved, as a result of which the display device can be installed in the motor vehicle in a space-saving and, moreover, cost-saving manner.

As an alternative or in addition to this, a touch gesture of the touch-sensitive main display screen may be provided, with the help of which it is possible to switch to an operating level of the virtual display level and back again from this. The touch gesture may, for example, be a rotation of a fingertip on the touch-sensitive screen of the main display area about 90 degrees. In this way, a versatile and extensive user concept is possible for the display device, which can nevertheless be used intuitively for the user.

A further advantageous embodiment provides that the main display area is configured as a transparent screen which is produced from transparent OLEDs, for example. The main display area therefore has a transmittance greater than zero and up to 1. Alternatively or in addition to this, the additional display area may be configured as a transparent screen. The transparent screen may be inconspicuously integrated in an environment. In addition, it allows numerous additional possible arrangements, such as in a windshield of a motor vehicle, for example.

The motor vehicle has a display device, as described above. The embodiments introduced in connection with the display device, and the advantages thereof apply correspondingly, insofar as applicable, to the motor vehicle.

In an advantageous embodiment of the motor vehicle, it is provided that the display device is arranged in a dashboard of the motor vehicle. The display device may therefore be positioned directly behind a steering wheel of the motor vehicle, for example, wherein the user sitting on the driver's seat can only view the main display area directly, but cannot view the secondary display area. In addition, the display device may not only be located in the immediate vicinity of the dashboard, but on a complete front wall of the motor vehicle between two A-pillars of the motor vehicle, for example, that is to say along the entire windshield at dashboard height. The secondary display area in this case is constantly out of sight for passengers sitting in the motor vehicle, in other words, for example, in an upper peripheral region of a recess in the motor vehicle in which the display device is arranged. The main display area is not only visible to the driver in the driver's seat, but also to a passenger on a passenger's seat in the motor vehicle, for example. In this way, a display device is supplied for the motor vehicle which at first sight is inconspicuous, space-saving and adjustable to the shape of the front region of the motor vehicle.

The display device is connected to a control device for a motor vehicle. The control device has a processor device which is set up to activate the display device. The processor device may have at least one microprocessor or at least one microcontroller or at least one FPGA (Field Programmable Gate Array) and/or at least one DSP (Digital Signal Processor). Furthermore, the processor device may have program code to activate the display device when executed by the processor device. The program code may be stored in a data store of the processor device.

The motor vehicle may be an automobile, in particular as a passenger vehicle or a truck, or a passenger bus or a motorcycle.

BRIEF DESCRIPTION OF THE DRAWINGS

These and other aspects and advantages will become more apparent and more readily appreciated from the exemplary embodiments described below, taken in conjunction with the accompanying drawings of which.

DETAILED DESCRIPTION

Figure 1:
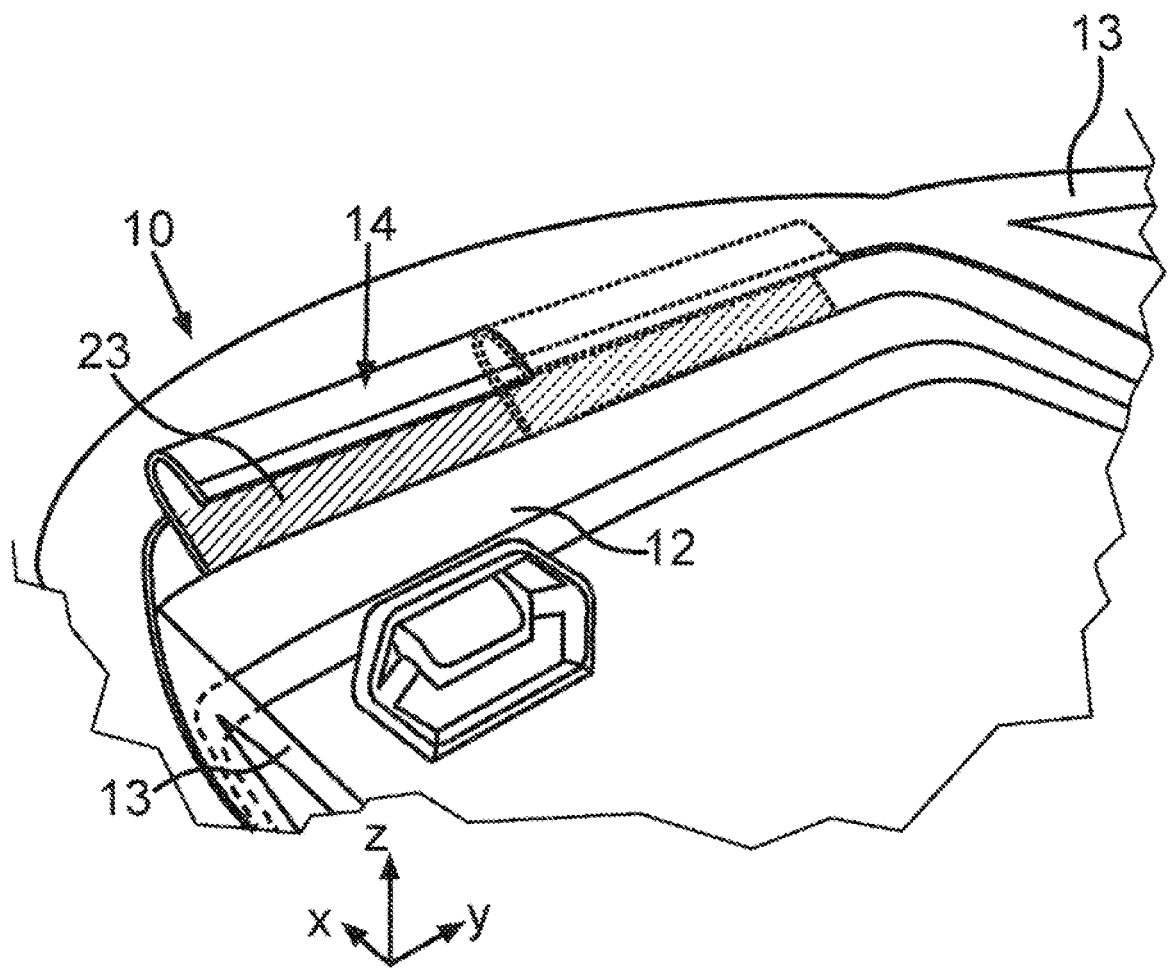
FIG. 1 is a schematic perspective view of a motor vehicle interior with a display device.

Reference will now be made in detail to the preferred embodiments, examples of which are illustrated in the accompanying drawings, wherein like reference numerals refer to like elements throughout.

In the exemplary embodiments, the components of the embodiments which are described each represent individual features which are to be regarded as independent of one another. The disclosure is therefore also intended to include combinations of features of the embodiments which differ from those depicted. Furthermore, additional features that have already been described can also be added to the embodiments that have been described.

In the figures, the same reference signs each denote elements with identical functions.

FIG. 1 shows a motor vehicle 10. A display device 14 is arranged in this motor vehicle 10 in the region of a dashboard 12 of the motor vehicle 10. This display device 14 may only be located in the region of the dashboard 12 itself. However, alternatively or in addition to this, it may also be formed in such a manner that it extends over an entire front region of the motor vehicle 10, so that it is ultimately arranged between two A-pillars 13 of the motor vehicle 10. This enlarged embodiment of the display device 14, compared with the embodiment in which the display device 14 is only arranged in the region of the dashboard 12, is shown using dotted lines in FIG. 1. In addition, a hatched area 23 is sketched in FIG. 1.

Figure 2:
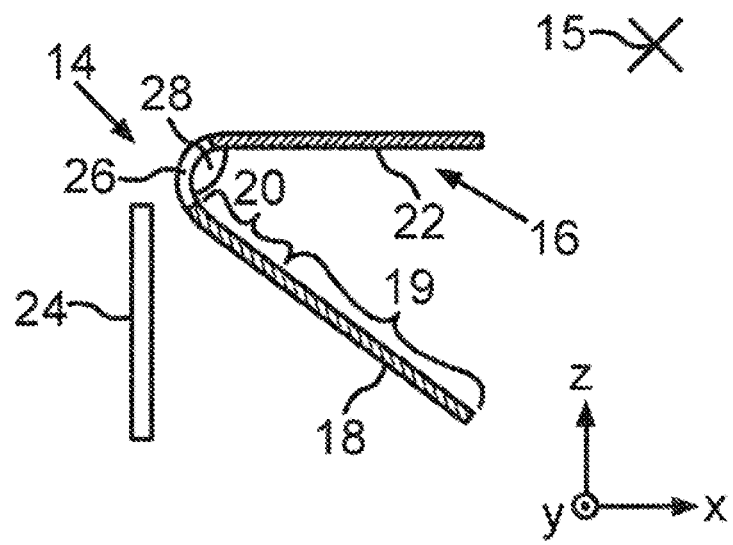
FIG. 2 is a cross-sectional view of a display device for a motor vehicle.

In FIG. 2, the display device 14 is depicted as a sectional representation. The display device 14 is observed by a viewer from a viewing point 15. This viewer will be a user of the motor vehicle 10, for example, who is sitting on a driver's seat of the motor vehicle 10 and looking at the display device 14. The display device 14 has a display area 16 designed in one piece. This firstly includes a main display area 18, which is arranged so as to be at least partly viewable from the viewing point 15. Strictly speaking, the main display area 18 has a partial region 19 that can be viewed from the viewing point 15 and a partial region 20 that cannot be seen from the viewing point 15. The partial region 19 that is visible is depicted as the hatched area 23 in FIG. 1. Moreover, the display area 16, as depicted in FIG. 2, has a secondary display area 22, which is arranged such that it cannot be viewed from the viewing point 15. The main display area 18 and the secondary display area 22 are separated from one another by a bending edge 26 in this case. The display area 16 therefore has a curved design, wherein the main display area 18 and the secondary display area 22 are arranged at an angle 28 to one another which is greater than zero and smaller than 90 degrees. Due to this arrangement of the display area 16, the main display area 18 and the secondary display area 22 are arranged relative to one another in such a manner that the secondary display area 22 is reflected in the main display area 18. Consequently, a virtual display level 24 that can be viewed from the viewing point 15 is produced behind the main display area 18.

Figure 3:
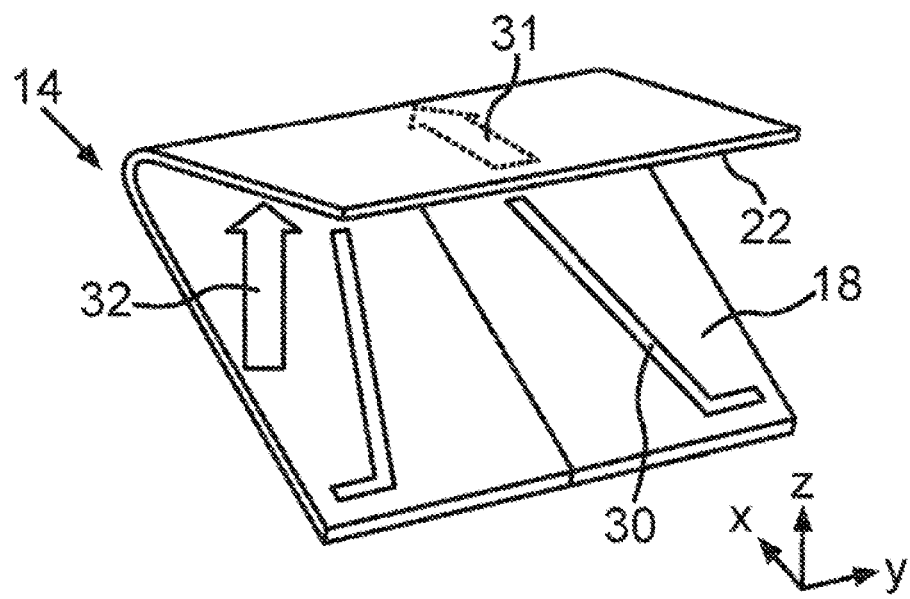
FIG. 3 is a perspective view of a display device for a motor vehicle.

A perspective view of the display device 14 is depicted in FIG. 3. In this case, a road layout 30 is displayed on the main display area 18. A displayed arrow 31 is represented on the secondary display area 22. This is reflected on the main display area 18, so that a virtual arrow 32 can be seen on the virtual display level 24. The virtual display level 24 therefore shows a display which is displayed on the secondary display area 22, but this is visible from the viewing point 15, having been reflected onto the virtual display level 24.

Figure 4A:
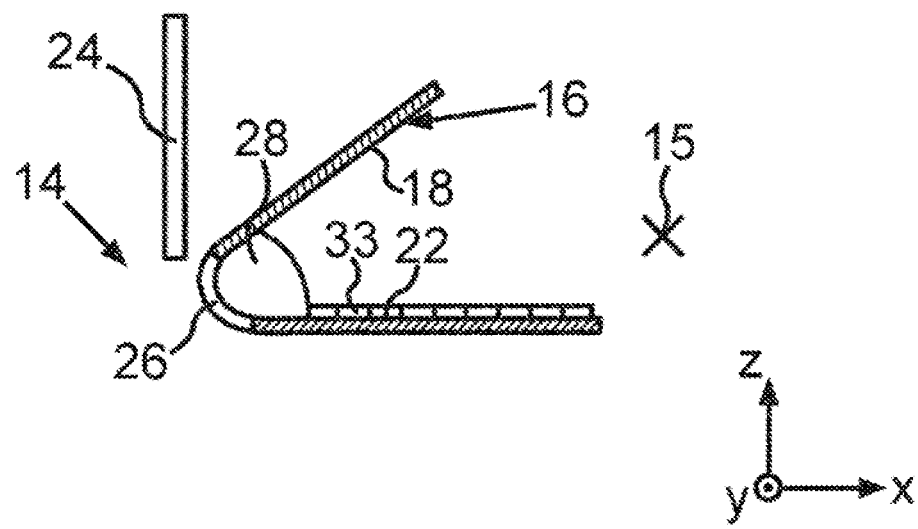
FIG. 4a is a cross-sectional view of a display device for a motor vehicle having a shutter film.
Figure 4B:
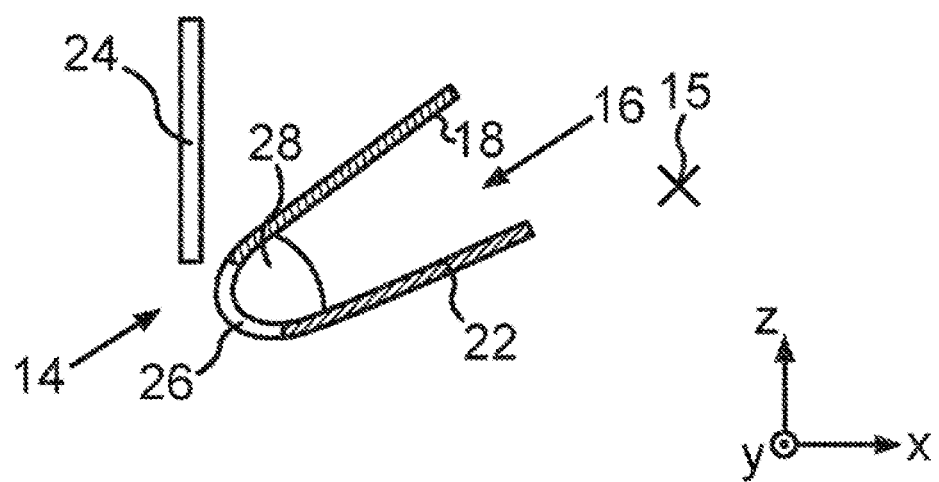
FIG. 4b is a cross-sectional view of a sharply curved display device for a motor vehicle.

A further display device 14 is depicted in FIG. 4a and FIG. 4b as a sectional representation in each case. The arrangement of the main display area 18 and the secondary display area 22 in this case is inverted by comparison with the arrangement described above; in other words, the secondary display area 22 is arranged in the vertical vehicle direction, in other words in the z-direction, below the main display area 18 in each case. In FIG. 4a, it is made possible with the help of a viewing protection film 33 on the secondary display area 22 for the display on the secondary display area 22 not to be seen from the viewing point 15. The viewing protection film 33 is a film frequently referred to as shutter film or privacy film which acts as a filter. The viewing protection film 33, which may include microscopic laminations, therefore causes a view of the display shown on the secondary display area 22 to be blocked outside a viewing angle of typically 60 degrees. In FIG. 4b, the angle 28 is between 0 degrees and under 45 degrees, so that in the case of the viewing point 15 as depicted, no viewing protection film 33 is needed on the secondary display area 22, in order ensure that the display shown there is not directly visible from the viewing point 15.

Figure 5:
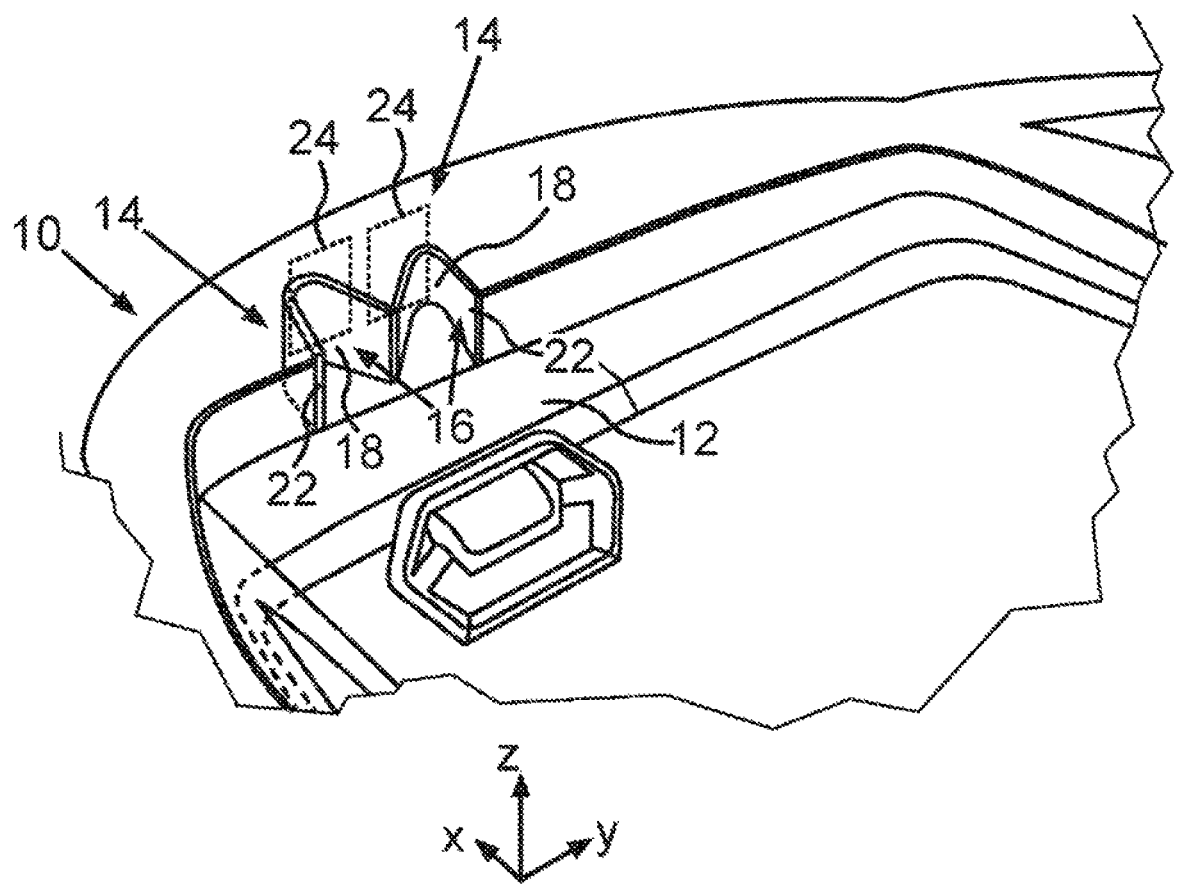
FIG. 5 is a schematic perspective view of a display device for a motor vehicle having two display areas arranged next to one another.

FIG. 5 shows two display devices 14 arranged alongside one another in the motor vehicle 10, which are arranged in the region of a recess in the dashboard 12. In this case, with each display device 14, the secondary display area 22 is arranged laterally in the transverse vehicle direction, in other words in the y-direction, alongside the main display area 18. In this case, viewed from the viewing point 15 of the driver of the motor vehicle 10 in each case, only the main display area 18 can be viewed at least sectionally, whereas the driver cannot view the secondary display area 22 directly. As an alternative to this, the display devices 14 depicted in FIG. 5 may be arranged in the motor vehicle 10 in a freestanding manner.

The display device 14 may also have a support element, as well as multiple controllable lighting elements which are arranged on the support element. The lighting elements arranged on the support element then form the display area 16, in other words ultimately the main display area 18 and the secondary display area 22. The multiple lighting elements in this case may each be configured as OLEDs, in other words as organic light-emitting diodes, or as micro-LEDs, in other words as micro-light-emitting diodes. Moreover, the main display area 18 may be configured as a touch-sensitive screen. If this is the case, not only is a pure display of information possible with the help of the display device 14, but a user concept for the motor vehicle 10 can also be supplied.

The curved OLED display illustrated in the drawings is formed as a curved display device 14 made of individually controllable lighting elements, wherein a portion of the display device is reflected in itself. In this case, a curved display area 16 is formed in such a manner that there are two regions. The first region lies in such a manner that a user of the motor vehicle 10 cannot see this region, in other words the first region exists in the form of the secondary display area 22. The second region lies obliquely thereto, so that a display on this region is visible to the user, in other words the main display area 18 is provided, which is visible at least in part from the viewing point 15. This second region, in other words the main display area 18, has a reflective design and reflects the display of the first region, in other words of the secondary display area 22. In this way, the virtual display level 24 is formed behind the main display area 18. A display of this kind on two display levels, in other words on the main display area 18 and the virtual display level 24 behind it, is particularly fascinating and, moreover, can be operated in an ergonomically advantageous manner, since particularly with the help of the embodiment of the main display area 18 as a touch-sensitive screen, a particularly user-friendly user concept can be implemented.

It should be noted in this case that the main display area 18 has advantageous reflecting properties, so that the display of the secondary display area 22 can easily be seen from the viewing point 15 reflected in the main display area 18. In this way, the virtual display level 24 can easily be seen on the main display area 18. This advantageous reflecting property of the main display area 18 is possible, for example, due to a corresponding coating of the main display area 18. Moreover, a degree of intensity of the display on the secondary display area 22 should be selected such that there can be a sufficiently clearly visible virtual display on the virtual display level 24, taking account of the ambient lighting in the motor vehicle 10, for example.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:
1. A display device for a motor vehicle, comprising:
 a display area in one piece and comprising:
  a main display area at least partially visible from a predefined viewing, and a secondary display area not visible from the viewing point, contiguous with the main display area and positioned to reflect display content off of the main display area to the viewing point to produce a virtual display level, visible from the viewing point of the display content of the secondary display area, that appears optically behind the main display area;

a support element; and controllable lighting elements arranged on the support element that form the main and secondary display areas, wherein the display device is curved and the main display area and the secondary display area form an angle greater than zero and smaller than 90 degrees.

2. The display device as claimed in claim 1, wherein the controllable lighting elements are at least one of organic light-emitting diodes and micro-light-emitting diodes.

3. The display device as claimed in claim 2, wherein the display device is curved and the main display area and the secondary display area form an angle greater than zero and smaller than 90 degrees.

4. The display device as claimed in claim 1, further comprising a bending edge of the display area between the main display area and the secondary display area.

5. The display device as claimed in claim 4, wherein the main display area is a touch-sensitive screen.

6. The display device as claimed in claim 5, wherein the main display area is transparent.

7. The display device as claimed in claim 1, further comprising a bending edge of the display area between the main display area and the secondary display area.

8. The display device as claimed in claim 1, wherein the main display area is a touch-sensitive screen.

9. The display device as claimed in claim 1, wherein the main display area is a transparent screen.

10. A motor vehicle, comprising:

a chassis;

a display device having a display area in one piece and including:

a main display area at least partially visible from a predefined viewing point, and a secondary display area not visible from the viewing point, contiguous with the main display area and positioned to reflect display content off of the main display area to the viewing point to produce a virtual display level, visible from the viewing point of the display content of the secondary display area, that appears optically behind the main display area;

a support element; and controllable lighting elements arranged on the support element that form the main and secondary display areas, wherein the display device is curved and the main display area and the secondary display area form an angle greater than zero and smaller than 90 degrees.

11. The motor vehicle as claimed in claim 10, wherein the controllable lighting elements are at least one of organic light-emitting diodes and micro-light-emitting diodes.

12. The motor vehicle as claimed in claim 10, further comprising a bending edge of the display area between the main display area and the secondary display area.

13. The motor vehicle as claimed in claim 12, wherein the main display area is a touch-sensitive screen.

14. The motor vehicle as claimed in claim 13, wherein the main display area is transparent.

15. The motor vehicle as claimed in claim 14, wherein the display device is arranged in a dashboard of the motor vehicle.

16. The motor vehicle as claimed in claim 10, wherein the display device is arranged in a dashboard of the motor vehicle.

* * * * *